United States Patent [19]

Arnold

[11] Patent Number: 5,219,378
[45] Date of Patent: Jun. 15, 1993

[54] RECIPROCATING CUTTING TOOL AND METHOD

[76] Inventor: Robert A. Arnold, 1900 High Dr., Liberty, Mo. 64068

[21] Appl. No.: 875,098

[22] Filed: Apr. 28, 1992

[51] Int. Cl.⁵ .............................................. B26B 3/00
[52] U.S. Cl. ...................................... 30/169; 30/337; 156/584
[58] Field of Search ...................... 30/272.1, 337, 339, 30/344, 169; 156/584; 15/236.01

[56] References Cited

U.S. PATENT DOCUMENTS

| | | | |
|---|---|---|---|
| 1,325,540 | 12/1919 | Spahr | 30/169 |
| 3,092,411 | 6/1963 | Hardy | 30/169 |
| 3,368,230 | 2/1968 | Kramer | 30/337 |
| 3,836,119 | 9/1974 | Saucier, Sr. et al. | 30/169 |
| 4,202,093 | 5/1980 | Wallerstein | 30/169 |
| 4,227,306 | 10/1980 | Meshulam | 30/339 |
| 4,542,554 | 9/1985 | Wallerstein | 30/169 |
| 4,779,301 | 10/1988 | Millette | 30/169 |

*Primary Examiner*—Douglas D. Watts
*Assistant Examiner*—Hwei-Siu Payer
*Attorney, Agent, or Firm*—Shook, Hardy & Bacon

[57] ABSTRACT

A reciprocating cutting tool includes a shank for mounting in a pneumatic hammer, a blade holder assembly connected to the shank and a blade clamped in the blade holder assembly. The blade holder assembly includes a base member and a retainer member which are clamped together. A blade receiver is formed between the base and retainer members. The base member includes a recess and the retainer member includes a shoulder which is received in the base member recess for abutment by a fixed end of the blade. A method of removing adhesively-attached ornamentation from a vehicle body panel includes the steps of providing a blade holder assembly with base and retainer members, providing a blade with a proximate end and a distal end having a sharpened distal cutting edge, clamping the base and retainer members together with the blade proximate end therebetween, providing the retainer member with a shoulder, abutting the blade proximate end against the shoulder, reciprocating the blade holder assembly and advancing the blade cutting edge through adhesive between the ornamentation and the vehicle body panel.

18 Claims, 1 Drawing Sheet

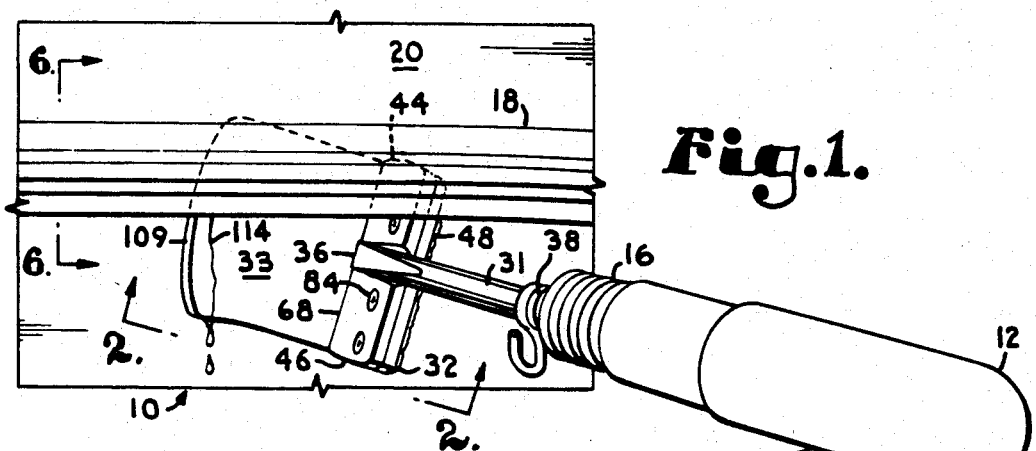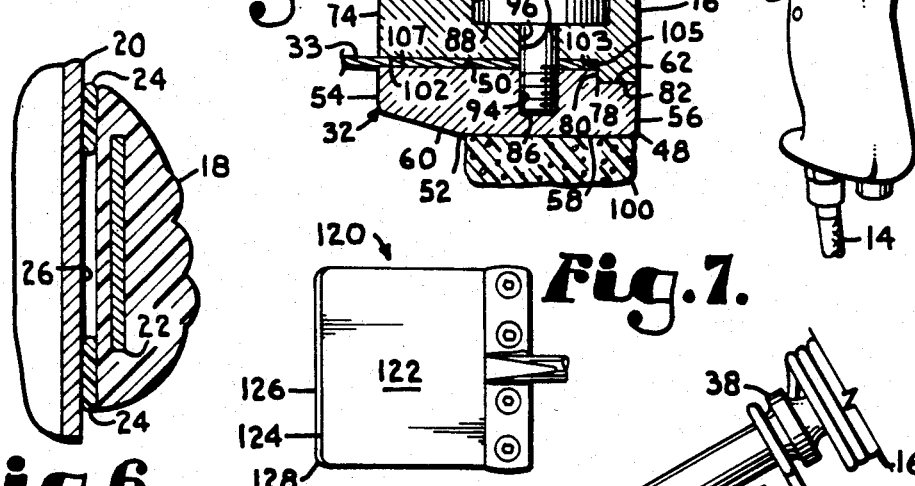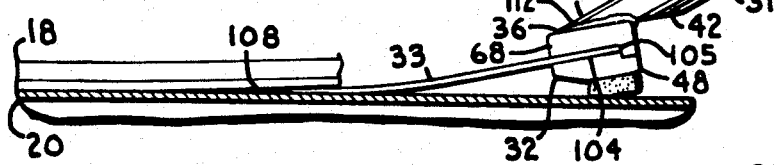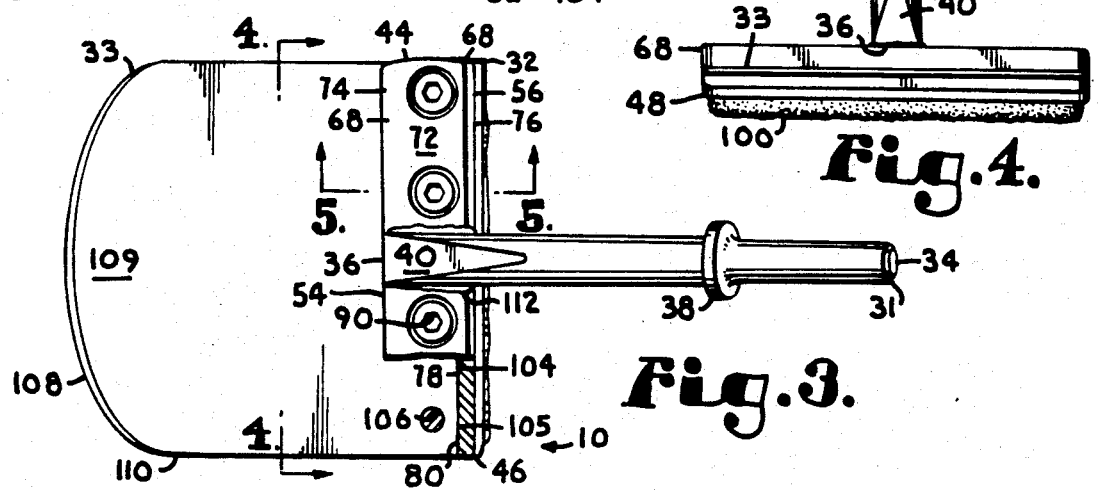

RECIPROCATING CUTTING TOOL AND METHOD

BACKGROUND OF THE INVENTION

1. Field of the Invention

The present invention relates generally to reciprocating cutting tools and methods, and more specifically to a reciprocating cutting tool and a reciprocating cutting method which are particularly well adapted for removing molding and emblems from vehicle body panels.

2. Description of the Prior Art

Cutting tools of different sizes and configurations have heretofore been devised to meet the requirements of various material cutting applications. Tools with reciprocating cutting actions typically have cutting edges along their side edges or leading edges and include a variety of chisels, saws, knives, scrapers, etc. Hand tools for reciprocative cutting include chisels, scrapers and various hand saws. Power tools for reciprocative cutting include motors for reciprocating various tool attachments, and can utilize various power sources such as electricity, compressed air, etc.

One type of reciprocating power tool which is commercially available comprises a pneumatic or air hammer. Air hammers are commonly used in the repair of vehicle bodies, with tool attachments such as chisels, punches and the like attached thereto. Vehicle repair facilities are commonly equipped with air compressors for powering air hammers and other pneumatic tools.

In repairing and replacing damaged vehicle body panels, it is often preferable to remove therefrom existing ornamentation (e.g., molding and emblems) to facilitate painting the new or repaired body panels. Otherwise, paint might tend to collect between the ornamentation and the body panels, which could be aesthetically undesirable. Such vehicle ornamentation is sometimes attached to the vehicle body panels by mechanical fasteners such as screws, but the holes for such mechanical fasteners can facilitate the onset of rust and corrosion in the body panels which are penetrated thereby. Therefore, a preferred method for attaching molding and emblems is with adhesive, which is preferably located at or near the peripheral edges of the ornamentation to prevent water from collecting therebehind.

Removing such ornamentation can involve cutting one or more beads of adhesive. One method of removing molding and emblems involves prying them loose from the vehicle body panels. However, molding and emblems pried loose from vehicles are susceptible to damage in the process. For example, vehicle body moldings often include strips of reinforcing material such as metal, which are susceptible to bending when removed from the vehicle body panel. Cutting wires have also been utilized for ornamentation removal. However, they often require two workers and can be relatively slow.

It is generally desirable to preserve the molding and emblems as intact as possible for reinstallation to minimize material costs. However, the molding and emblems must be removed relatively quickly to avoid incurring undue labor costs.

Heretofore, there has not been available a reciprocating cutting tool and method with the advantages and features of the present invention. The present invention addresses some of the shortcomings and disadvantages of previous tools and procedures as noted above.

SUMMARY OF THE INVENTION

In the practice of the present invention, a reciprocating cutting tool is provided which includes a shank for mounting on a power tool, for example, an air hammer. A blade holder assembly is mounted on the shank and includes a base member and a retainer member. The retainer member has a shoulder which is received in a recess formed in the base member. The base and retainer members are clamped together, e.g., by mechanical fasteners, and form a blade receiver therebetween which terminates at the retainer member shoulder. A blade includes a fixed, proximate end which is clamped between the base and retainer members in the blade receiver in abutment with the shoulder and a distal end with a cutting edge. In the practice of the method of the present invention, molding and emblems are removed from vehicle body panels by reciprocating a cutting tool. The method includes the steps of providing base and retainer members, clamping a blade therebetween, providing a distal cutting edge on the blade and guiding the tool between a vehicle body panel and ornamentation adhesively mounted thereon. The tool is reciprocated automatically and its cutting edge separates an adhesive bead securing the molding or the emblem to the vehicle body panel.

OBJECTS AND ADVANTAGES OF THE INVENTION

The principal objects and advantages of the present invention include: providing a reciprocating cutting tool; providing such a tool with a shank, a blade holder assembly and a blade; providing such a tool wherein the blade holder assembly is relatively heavy in relation to the blade; providing such a tool wherein the blade is securely retained in place by the blade holder assembly; providing such a tool which includes a shoulder for abutment by a fixed end of the blade; providing such a tool with a replaceable blade; providing such a tool which is particularly well adapted for removing ornamentation such as molding and emblems from vehicle body panels; providing such a tool which is adapted for use in connection with commercially available air hammers; providing such a tool which is economical to manufacture, efficient in operation and capable of a long operating life; providing a reciprocating cutting method; providing such a method which is particularly well adapted for removing ornamentation such as emblems and molding from vehicles; providing such a method which tends to be relatively efficient; providing such a method which can be practiced with air hammers which are commercially available; providing such a method which utilizes a reciprocating cutting tool with a replaceable blade; and providing such a method which can be adapted to various vehicle body styles for removing molding and emblems therefrom.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a reciprocating cutting tool embodying the present invention, shown mounted in a pneumatic hammer and in the process of removing molding from a vehicle body panel in accordance with a method of the present invention.

FIG. 2 is an enlarged, fragmentary, cross-sectional view of the reciprocating cutting tool, taken generally along line 2—2 in FIG. 1.

FIG. 3 is a top plan view of the reciprocating cutting tool, with portions broken away to reveal internal construction.

FIG. 4 is a fragmentary, distal end elevational view of the reciprocating cutting tool taken generally along line 4—4 in FIG. 3.

FIG. 5 is an enlarged, fragmentary, cross-sectional view of the reciprocating cutting tool, taken generally along line 5—5 in FIG. 3.

FIG. 6 is an enlarged, cross-sectional view taken generally along line 6—6 in FIG. 1 and particularly showing molding adhesively attached to the vehicle body panel.

FIG. 7 is a fragmentary, top plan view of a reciprocating cutting tool comprising a first modified or alternative embodiment of the present invention.

DETAILED DESCRIPTION OF PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 10 generally designates a reciprocating cutting tool, shown operably inserted into a pneumatic hammer 12. The pneumatic hammer 12 can be a handheld type which is adapted for connection to a compressed air source (not shown) by an air inlet hose 14. The pneumatic hammer 12 includes a helical spring 16 for interchangeably retaining tools. Pneumatic hammers such as that shown at 12 are commercially available and operate by reciprocating tools inserted thereinto, for example at operating speeds of 1,000 cycles per minute or more.

Without limitation on the generality of useful applications of the tool 10, it is shown removing a length of molding 18 from a vehicle body panel 20. The molding 18 has embedded therein a longitudinally-extending reinforcing strip 22 which can comprise a material such as aluminum for increasing the rigidity of the molding 18. The molding 18 can be attached to the vehicle body panel 20 by a pair of adhesive beads 24.

As shown in FIG. 6, a slight molding gap 26 can be formed between the molding 18 and the body panel 20, with the adhesive beads 24 filling portions thereof.

The tool 10 generally comprises a shank 31, a blade holder assembly 32 and a blade 33.

II. Shank 31

The shank 31 is generally cylindrical with proximate and distal ends 34, 36. The shank proximate end 34 is adapted to be inserted into the pneumatic hammer 12 and includes an annular retainer flange 38 for securing the shank 31 in the pneumatic hammer 12 by means of the spring 16.

The shank distal end 36 includes upper and lower portions 40, 42 which can be flattened and which converge distally. The shank distal end lower portion 42 can generally lie in a plane which intersects at an acute angle the longitudinal axis of the shank 31. The shank distal end upper portion 40, on the other hand, can generally lie in a plane which is approximately parallel to the longitudinal axis of the shank 31.

Reciprocating cutting tools 10 which embody the present invention can be provided with shanks of various lengths.

III. Blade Holder Assembly 32

The blade holder assembly 32 extends generally transversely with respect to the shank 31 and generally forms the configuration of a "T" therewith. The blade holder assembly 32 includes first and second ends 44, 46.

The blade holder assembly 32 includes a base member 48 with inner and outer faces 50, 52 and leading and trailing edges 54, 56. The base member outer face 52 includes a proximate portion 58 which is generally parallel to the inner face 50 and a distal portion 60 which converges from the proximate portion 58 towards the base member leading edge 54. The base member outer face portions 58, 60 generally form an obtuse dihedral angle with respect to each other. A base member recess 62 extends between the blade holder assembly ends 44, 46 and is open at the base member inner face 50 and at its trailing edge 56.

A retainer member 68 includes inner and outer faces 70, 72 and leading and trailing edges 74, 76. The retainer member 68 includes blade stop means comprising a shoulder 78 which projects from the retainer member inner face 70 in proximity to the retainer member trailing edge 76. The shoulder 78 extends between the blade holder assembly ends 44, 46.

The shoulder 78 includes an abutment face 80 which extends perpendicularly between the member inner faces 50 and an offset face 82 which is offset from (i.e., below) and generally parallel to the retainer member inner face 70.

The blade holder assembly 32 includes fastening means comprising a plurality (e.g., four are shown) of screws 84 with male-threaded shanks 86 and heads 88 with hexagonal, closed-end bores 90 for driving engagement with an Allen wrench. The blade holder assembly 32 includes a corresponding plurality of screw receivers 92 each including: a female-threaded, closed-end base portion 94 open at the base member inner face 50; a smooth bore retainer portion 96 open at the retainer member inner face 70; and a counterbore portion 98 open at the retainer member outer face 72.

A base cushion strip or pad 100 can be attached to the proximate portion 58 of the base member outer face 52. The cushion strip 100 can comprise, for example, a resilient, non-scratching material such as foam rubber or fabric which can be held in place adhesively.

A blade end receiver 102 is formed between the member inner faces 50 and includes a closed, proximate end 103 at the shoulder abutment face 80 and an open, distal end 107. The blade end receiver 102 is penetrated by the screw shanks 86.

The shank 31 is attached to the blade holder assembly 32, for example, by welding the shank distal end 42 on top of the retainer member outer face 72 approximately midway between the blade holder assembly ends 44, 46 with a weldment 112 formed between the shank distal end 36 and the retainer member 68. Due to the angular orientation of the shank distal end lower portion 42 with respect to the shank longitudinal axis, the blade 33 lies generally in a plane with a corresponding angular or skewed orientation with respect to the longitudinal axis of the shank 31. However, the tool 10 can be constructed with such angular orientations in a relatively wide range of suitable angles, or with the blade 33 substantially coplanar with the longitudinal axis of the shank 31.

IV. Blade 33

The blade 33 can comprise a suitable flexible spring tool steel with memory properties for returning the blade 33 to its original, generally planar configuration when not subjected to a bending load. Other desired characteristics of the blade 33 include hardness for holding a cutting edge 108 and a relatively smooth finish on the surfaces of the blade 33 to avoid or at least reduce the possibility of damage to the finish of the vehicle body panel 20.

The blade 33 includes a proximate fixed end 104 with a proximate edge 105 and a plurality of blade fastener receivers 106 corresponding to the locations of the screw receivers 92 in the blade holder assembly 32. The blade 33 includes a distal free end 109 with a distal cutting edge 108 which can be sharpened and can have a distally-convex, curved configuration (FIGS. 1 and 3). The blade 33 includes a pair of generally parallel side edges 110 which are spaced apart a distance slightly less than a width of the blade holder assembly 32 between its ends 44, 46.

The blade 33 is mounted in the blade holder assembly 32 by placing its fixed end 104 in the blade receiver 102 with the blade proximate edge 105 preferably in abutment with the shoulder abutment face 80. The screws 84 extend through the screw receivers 92 and the blade fastener receivers 106 whereby the base and retainer members 48, 68 can be clamped tightly together with their inner faces 50, 70 in clamping engagement on the blade proximate end 104.

The blade distal cutting edge 108 can be formed by honing one face (e.g., the outer face which is engaged by the retainer member 68) of the blade 33 to a relatively sharp convergence with the other face of the blade 33. Spring tool steel with a thickness of about 0.012 inches has been found to be suitable for the blade 33. The honed cutting edge 108 can have a width of about 0.0625 inches whereby an included dihedral angle in the range of about 10° to 12° is formed between the cutting edge 108 and the other face of the blade 33.

After honing the cutting edge 108, it has been found to be preferable to polish the cutting edge 108 with a suitable, very fine abrasive, such as sandpaper with number 2000 grit. The cutting edge 108 thus has a degree of sharpness which facilitates separation of the adhesive beads 24, while protecting the finish on the vehicle body panel 20 from damage which could occur if the cutting edge 108 were not polished in this manner.

V. Reciprocating Cutting Method

A reciprocating cutting method in accordance with the present invention is disclosed which utilizes the cutting tool 10. The method is disclosed in connection with a procedure for removing the molding 18 from a vehicle body panel 20, but could be practiced in a variety of other useful procedures.

The reciprocating cutting method includes the steps of mounting the cutting tool 10 in the pneumatic hammer 12 and actuating the hammer 12, i.e., by communicating a source of pressurized air therewith.

The cutting edge of the blade 33 separates the adhesive beads 24, allowing the tool 10 to advance. The tool 10 can generally slide between the separated molding 18 and the vehicle body side panel 20 with the shank 31 generally sliding along one side of the molding 18. In this fashion the tool 10 can be advanced along the entire length of the molding 18 for removing same. The cushion strip 100 protects the finish of the vehicle body panel 20 as the tool 10 slides therealong.

Although the tool 10 can be used in various ways, each adapted to the configuration and position of a piece of ornamentation being removed, a preferred method of use involves advancing the tool 10 in a direction generally transverse to a longitudinal axis of the molding 18 whereby a section of the molding 18 roughly corresponding to the width of the blade 33 is separated from the body panel 20 on each pass of the tool 10. The tool 10 can thus be advanced along the length of the molding 18 in successive cutting swaths. This transverse cutting procedure can be practiced by inserting the blade 33 from either side of the molding 18, depending upon the position and orientation of the body panel 20 and the characteristics of the molding 18. For example, if difficulty is encountered in inserting the blade 33 from one side of the molding 18 due to damage or some other cause, it may be possible to insert the blade 33 from the other side or from an end of the molding 18. Since a wide variety of ornamentation configurations and positions may be encountered, a correspondingly wide variety of techniques and procedures may be practiced with the tool 10 to perform particular cutting procedures.

For certain applications of the method described above, the procedure can be facilitated by applying a suitable lubricant 114 to the blade 33, particularly along its distal cutting edge 108, and to the edges of the molding 18 adjacent to the adhesive beads 24. The lubricant 114 can comprise, for example, a soap-like material, such as a type of material which is commonly used in vehicle body shops for coating and masking parts, or some other suitable lubricant for reducing friction on the blade 33 as it passes through the adhesive beads 24.

With the base and retainer members 48, 68 tightly clamped together by the screws 84, the blade proximate edge 105 preferably abuts the shoulder abutment face 80. The blade holder assembly 32 preferably has a significantly greater mass than the blade 33. The momentum of the blade holder assembly 32 as it is reciprocated by the pneumatic hammer 12 can transmit substantial cutting and thrusting force to the blade 33. The greatest forces are anticipated to be compressive forces during thrust strokes as the tool 10 advances through the adhesive beads 24. The impacts of such compressive forces are transferred from the blade 33 directly into the shoulder 78 for resistance and absorption by the entire mass of the blade holder assembly 32. It is anticipated that at least partly because of this direct, abutment-contact, force-transmitting feature of the tool 10, there is little tendency for the screws 84 to loosen or for the blade holder assembly 32 to release its clamping engagement grip on the blade 33. It is also anticipated that this feature of having the force applied directly to the shoulder 78 can considerably prolong the useful life of the tool 10 in operation.

Other vehicle ornamentation, such as emblems and the like, can be removed from the body panel 20 by following a similar procedure according to the method of the present invention.

VI. First Alternative or Modified Embodiment Reciprocating Cutting Tool 120

FIG. 7 shows a cutting tool 120 comprising a first modified or alternative embodiment of the present invention. For vehicle ornamentation removal applications, the configuration of the modified cutting tool 120 is generally preferred over that of the cutting tool 10 described above, but such preferences may vary among different users and among different ornamentation-removal task conditions.

The cutting tool 120 is substantially identical to the cutting tool 10 described above, except for a blade 122 with a modified configuration. The blade 122 includes a distal end 124 with a relatively straight cutting edge 126 whereby the blade 122 has a substantially rectangular configuration with rounded distal corners 128.

The modified or alternative embodiment reciprocating cutting tool 120 can function in a manner substantially similar to the reciprocating cutting tool 10 in accordance with the method of the present invention.

It is to be understood that while certain forms of the present invention have been illustrated and described herein, it is not to be limited to the specific forms or arrangement of parts described and shown.

What is claimed and desired to be secured by Letters Patent is as follows:

1. A blade holder for mounting a blade with a fixed end to a shank, which comprises:
    a base member;
    a retainer member;
    mounting means for mounting said retainer member on said base member;
    a blade fixed end receiver formed between said base member and said retainer member;
    stop means associated with said base member and said retainer member for engaging the blade fixed end, said stop means comprising a shoulder formed on said base member and a recess formed in said retainer member, the shoulder being received in the recess; and
    shank mounting means for mounting the shank on said base member.

2. The blade holder as set forth in claim 1, which includes:
    said base member having an inner face with said recess open thereat;
    said retainer member having an inner face with said shoulder projecting therefrom; and
    said blade fixed end receiver being formed between said base and retainer member inner faces.

3. The blade holder as set forth in claim 2 wherein said mounting means comprises a mechanical fastener.

4. The blade holder as set forth in claim 3, which includes:
    a fastener receiver comprising a female-threaded base member portion located in said base member and open at said base member inner face and a retainer member portion extending through said retainer member and open at said retainer member inner face; and
    said fastener comprising a screw rotatably received in said receiver retainer member portion and threadably received in said receiver base member portion.

5. The blade holder as set forth in claim 1, which includes:
    said base member having a leading edge, a trailing edge, an inner face and an outer face; and
    said base member outer face having a sloping configuration converging toward said base member inner face at a reduced thickness area adjacent to said base member leading edge from a maximum thickness area adjacent to said base member trailing edge.

6. The blade holder as set forth in claim 1, which includes:
    cushion means mounted on said base member.

7. A reciprocating cutting tool, which comprises:
    an elongated shank having a longitudinal axis and a proximate end and a distal end having a flattened portion;
    a blade holder assembly including:
        a base member with a base member inner and outer faces, base member leading and trailing edges and a recess open at said base member inner face and at said base member trailing edge;
        a retainer member with retainer member inner and outer faces, retainer member leading and trailing edges and a shoulder projecting from the retainer member inner face and received in the base member recess;
        blade holder fastener means for fastening the base and retainer members together, the shank flattened portion generally lying in a plane which forms an acute angle with respect to the shank longitudinal axis;
    shank mounting means comprising a weldment securing said flattened portion to the outer face of the retainer member for mounting the shank to the retainer member;
    a blade fixed end receiver formed between said base member inner face and said retainer member inner face, said blade fixed end receiver having a proximate end closed by said shoulder and an open, distal end; and
    a blade including a fixed proximate end, a free distal end and a cutting edge formed on said distal end, said fixed proximate end of the blade being received in said blade fixed end receiver.

8. The tool as set forth in claim 7 wherein:
    said blade holder assembly includes first and second opposite ends; and
    said base member recess and said retainer member should extend between said blade holder assembly opposite ends.

9. The tool as set forth in claim 7, which includes:
a fastener receiver including a female-threaded base member portion located in said base member and open at said base member inner face and a retainer member portion extending through said retainer member and open at retainer member inner face; and
a screw rotatably received in said receiver retainer member portion and threadably received in said receiver base member portion.

10. The tool as set forth in claim 7 wherein:
said blade cutting edge has a curved, distally-convex configuration.

11. The tool as set forth in claim 7 wherein:
said blade cutting edge has a generally straight configuration.

12. The tool as set forth in claim 7, which includes:
cushion means mounted on said base member outer face.

13. The tool as set forth in claim 7, which includes:
said base member outer face having a sloping configuration converging toward said base member inner face at a reduced thickness area adjacent to said base member leading edge from a maximum thickness area adjacent to said base member trailing edge.

14. The tool as set forth in claim 7 wherein:
said blade is generally planar, and is made of flexible spring tool steel having the property for returning to its original, generally planar configuration when not subjected to a bending load.

15. The tool as set forth in claim 14 herein said blade is made of spring tool steel with a thickness of about 0.012 inches and having a honed cutting edge with a width of about 0.0625 inches whereby an inclined angle in the range of about 10° to 12° is formed between the cutting edge and a face of the planar blade.

16. A reciprocating tool, which comprises:
a shank with proximate and distal ends;
a blade holder assembly including:
a base member with base member inner and outer faces, base member leading and trailing edges and a recess open at said base member inner face and at said base member trailing edge;
a retainer member with retainer member inner and outer faces, retainer member leading and trailing edges and shoulder projecting from the retaining member inner face and received in the base member recess; and
blade holder fastener means for fastening the base and retainer members together;
shank mounting means for mounting the shank to the retainer member;
a blade fixed end receiver formed between said base member inner face and said retainer member inner face, said blade fixed end receiver having a proximate end closed by said shoulder and an open distal end; and
a blade including a fixed proximate end, a free distal end and a cutting edge formed on said distal end, said fixed end being received in said blade fixed end receiver,
said base member outer face having a sloping configuration converging toward said base member inner face at a reduced thickness area adjacent to said base member leading edge from a maximum thickness area adjacent to said base member trailing edge.

17. A reciprocating tool, which comprises:
a shank with proximate and distal ends;
a blade holder assembly including:
a base member with base member inner and outer faces, base member leading and trailing edges and a recess open at said base member inner face and at said base member trailing edge;
a retainer member with retainer member inner and outer faces, retainer member leading and trailing edges and shoulder projecting from the retaining member inner face and received in the base member recess; and
blade holder fastener means for fastening the base and retainer members together;
shank mounting means for mounting the shank to the retainer member;
a blade fixed end receiver formed between said base member inner face and said retainer member inner face, said blade fixed end receiver having a proximate end closed by said shoulder and an open distal end; and
a blade including a fixed proximate end, a free distal end and a cutting edge formed on said distal end, said fixed end being received in said blade fixed end receiver; and
cushion means mounted on said base member outer face.

18. A reciprocating cutting tool, which comprises:
a shank with a proximate end, a distal end, a longitudinal axis, and an annular retainer flange positioned in proximity to said shank proximate end;
said shank distal end including a lower, flattened portion generally lying in a plane which forms an acute angle with respect to the shank longitudinal axis;
a blade holder assembly including:
first and second opposite ends;
a base member with base member inner and outer faces, base member leading and trailing edges and a recess open at said base member inner face and at said base member trailing edge, said recess extending between said blade holder assembly ends;
a retainer member with retainer member inner and outer faces, retainer member leading and trailing edges and a shoulder projecting from the retainer member inner face and received in the base member recess, said shoulder extending between said blade holder assembly ends;
a plurality of fastener receivers each having a female-threaded base member portion located in said base member and open at said base member inner face and a retainer member portion extending through said retainer member and open at said retainer member inner and outer faces;
a plurality of screws each received in a respective fastener receiver, each said screw being rotatably received in a respective receiver retainer member portion and threadably received in a respective receiver base member portion;
a blade fixed end receiver formed between said base member inner face and said retainer member inner face, said blade fixed end receiver having a proximate end closed by said shoulder and an open, distal end;
said base member outer face having a sloping configuration converging toward said base member inner face at a reduced thickness area adjacent to said base member leading edge from a maximum thickness area adjacent to said base member trailing edge; and cushion means mounted on said base member outer face; and a blade including a fixed proximate end with a proximate edge, a free distal end, a distal cutting edge formed on said distal end and a plurality of blade fastener receivers in said blade fixed proximate end each receiving a respective screw, said blade proximate end being clamped between said member inner faces with said proximate edge thereof in abutment with said shoulder.

* * * * *